US 9,383,043 B2

(12) United States Patent
Klein et al.

(10) Patent No.: US 9,383,043 B2
(45) Date of Patent: Jul. 5, 2016

(54) SEALING TUBE

(75) Inventors: Manfred Klein, Kaufering (DE); Tom Hager, Trippstadt (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 13/333,334

(22) Filed: Dec. 21, 2011

(65) Prior Publication Data

US 2012/0217424 A1 Aug. 30, 2012

(30) Foreign Application Priority Data

Dec. 21, 2010 (DE) .................. 10 2010 063 652

(51) Int. Cl.
*H02G 3/04* (2006.01)
*F16L 5/04* (2006.01)
*F16L 5/10* (2006.01)
*H02G 3/22* (2006.01)

(52) U.S. Cl.
CPC ...... *F16L 5/04* (2013.01); *F16L 5/10* (2013.01); *H02G 3/22* (2013.01)

(58) Field of Classification Search
CPC ....... H02G 15/013; H02G 15/04; H02G 3/22; H05B 3/06; F16L 5/04; F16L 5/10
USPC ......... 174/77 R, 84 R, 88 R, 88 S, 89, 92, 93, 174/138 G, 153 G, 99 E, 99 R
See application file for complete search history.

(56) References Cited

U.S. PATENT DOCUMENTS

| 2,416,063 | A | * | 2/1947 | Nicholls | F16L 3/1233 174/40 CC |
| 3,606,218 | A | * | 9/1971 | Enlund | F16L 55/035 248/74.2 |
| 4,268,041 | A | * | 5/1981 | Sovish et al. | 277/314 |
| 4,314,093 | A | * | 2/1982 | Eldridge et al. | 174/73.1 |
| 4,441,677 | A | * | 4/1984 | Byerly | 248/74.3 |
| 6,443,403 | B1 | * | 9/2002 | Page | F16L 3/1233 24/16 PB |
| 6,862,852 | B1 | * | 3/2005 | Beele | 52/220.8 |
| 8,438,804 | B2 | * | 5/2013 | Nowoczin et al. | 52/220.8 |
| 2008/0128998 | A1 | * | 6/2008 | Klein et al. | 277/604 |
| 2009/0148239 | A1 | * | 6/2009 | Hickey, II | 405/155 |
| 2009/0320392 | A1 | * | 12/2009 | Nowoczin et al. | 52/220.8 |
| 2011/0094759 | A1 | * | 4/2011 | Lopes | 169/48 |

FOREIGN PATENT DOCUMENTS

DE  102005001796 A1  7/2006
DE  102006035475 A1  6/2008
(Continued)

OTHER PUBLICATIONS

WO 2010067637 English Translation.*
(Continued)

*Primary Examiner* — Jenny L Wagner
*Assistant Examiner* — Pete Lee
(74) *Attorney, Agent, or Firm* — McAndrews, Held & Malloy, Ltd.

(57) ABSTRACT

A sealing tube for a line conduit, in which the sealing tube can be held at its ends, which can be distorted in reference to each other about its longitudinal axis. Inside the sealing tube, several separate sealing elements are arranged, which extend over a small portion of the length of the sealing element.

16 Claims, 2 Drawing Sheets

(56) References Cited

FOREIGN PATENT DOCUMENTS

EP 0940615 A1 9/1999
WO 2010067637 A1 6/2010

OTHER PUBLICATIONS

Light Guard Peel and Seal Grommet System for Sealed Fiber Optic Closures Copyrighted in 2002.*

Takanari (WO20100676371 A1 English Translation).*
Takanari (WO 20100676371 English Translation).*
German Patent Office official action in Application No. 102010063652.5 dated Sep. 8, 2011 (5 pages).
EP Communication, Sep. 7, 2012 in Application No. 11190081.7 (5 pages).

* cited by examiner

SEALING TUBE

RELATED APPLICATIONS

The present application claims priority to German Patent Application DE 10 2010 063 652.5 filed Dec. 21, 2010 and entitled "Dichtschlauch" ("Sealing Tube"), the entire content of which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to a sealing tube for a line conduit, in which the sealing tube can be held with its ends distorted in reference to each other in the longitudinal direction.

Such a sealing tube is known from DE 10 2006 035 475 A1. The line conduit serves to guide lines, such as pipelines, cables, or cable channels through other parts, for example, through ceilings or walls. The line conduit allows, on the one hand, the subsequent exchange or adding of lines, and, on the other hand, a sealing is accomplished, particularly against smoke gas. For this purpose, the sealing tube is used, through which the lines are guided from one side of the wall or ceiling to the other side. After the assembly of the lines the two ends of the sealing tube are distorted in reference to each other, causing the walls of the sealing tube to be pulled spirally inwardly and tightly contacting the lines. This way, high density is achieved.

It is already known from the above-mentioned publication to apply thin foam or rubber material to the inside of the sealing tube either as a continuous coating or in the form of longitudinal strips or ribs. Although this sealing material improves the sealing effect in the areas contacting the lines, it has shown that simultaneously the distortion is hindered, particularly the necessary formation of folds.

BRIEF SUMMARY OF THE INVENTION

An objective of aspects of the present invention comprises further developing a sealing tube for an improved sealing effect.

These and other objectives are accomplished by providing, according to aspects of the present invention, that inside the sealing tube several separate sealing elements are arranged. The sealing elements are arranged approximately in the center of the sealing tube, thus at half of its length, and their length extends essentially along the circumference, i.e., perpendicularly in reference to the longitudinal axis of the sealing tube. The sealing elements are interrupted and only reach a closed state, i.e. a ring, upon the distortion of the sealing tube. Here, the sealing elements act like an annular barrier, which is pressed by the sealing tube in the radial direction inwardly against the lines. This way a particularly good sealing effect develops.

The sealing elements may be arranged along a line describing the circumference of the sealing tube, with the sealing elements not mandatorily being arranged equally along a line. A diagonal and/or irregular arrangement may also be employed, similar to a straight arrangement, also leading to an improved sealing effect.

Aspects of the present invention are based on the surprising acknowledgment that it is possible, with several short sealing elements, arranged at a distance from each other, to yield an overall better sealing effect without compromising the deformation of the wall of the sealing tube.

Preferably, the sealing elements are distanced from each other in the circumferential direction of the sealing tube. This allows the wall of the sealing tube to spirally contract in the circumferential direction, unhindered by the sealing elements.

Preferably, the overall length of the sealing elements is smaller than the circumference of the sealing tube, with the overall length being calculated from the total of the lengths of the elements located in a cross-sectional level, which is defined by a cross section through the tube perpendicularly in reference to its longitudinal axis. In a diagonal and/or irregular arrangement of the sealing elements, the actual total of the length of the individual elements may be longer than the circumference of the sealing tube. Particularly preferred, the overall length of the sealing element amounts to approximately 50% of the circumference of the sealing tube.

Contrary to the common opinion, according to which sealing elements shall be used as large as possible in order to ensure a large-surface contact to the line, it has been shown according to aspects of the present invention that even very small sealing elements are capable of achieving the desired sealing effect against the penetration of gaseous media. A particular advantage of the sealing elements according to aspects of the present invention is the fact that they hardly interfere with the deformation of the wall such that it can tightly contact the lines unhindered.

According to an embodiment of the invention, six sealing elements are provided, which are arranged in the circumferential direction of the sealing tube equally distanced from each other. Preferably, the length of an individual sealing element for this embodiment is approximately equivalent to 8% of the circumference of the sealing tube. This embodiment is based on the acknowledgment that even relatively few sealing elements can achieve a very good sealing effect.

Preferably, the sealing elements show a triangular cross-section. This cross-sectional form facilitates that the sealing elements adjust to the lines located inside the sealing tube and tightly contact them.

Preferably, the sealing elements are slotted perpendicularly in reference to their longitudinal direction. This also promotes the tight contact of the sealing elements to the lines because the sealing elements are particularly flexible due to the slots.

The height of the sealing elements should be selected such that, on the one hand, they penetrate into the spaces of the exterior cables of the cable harness as far as possible, and, on the other hand, the provision of the sealing tube with cables is not hindered in the open tube. A height from about 5 millimeters to 20 millimeters has proven advantageous. Particularly preferred the height amounts to about 11 millimeters. The height of the sealing elements here is independent from the circumference of the sealing tube and the length of the sealing elements.

The material of the sealing elements should be characterized such that it is sufficiently elastic and contacts the cable harness with as few remaining gaps as possible in order to essentially seal any gaps developing between the exterior cables of the cable harness. Furthermore, it should be ensured that the material itself is tight, i.e. in case of a fire no smoke gases can penetrate the material. Accordingly the material should be impermeable to air. Suitable materials are open-, closed-, and mixed-celled foams, with the open-celled foams preferably showing an essentially closed surface. For example, integral foams, silicon, elastomer, as well as natural and synthetic rubbers, polyurethane foams (PUR), nitrile rubber (NBR), styrene butadiene rubber (SBR), and ethylene propylene diene rubber (EPDM) and the like are mentioned.

Ethylene propylene diene rubber (EPDM) has proven particularly suitable for use inside the sealing tube, and particularly suitable is closed-celled ethylene propylene diene rubber (EPDM).

The sealing elements can be adhered or sewn to the sealing tube. This allows the mounting of them with little expense. Alternatively, the sealing elements can be directly applied to the sealing tube, which in this case acts as the carrier, for example, by a direct spraying onto the material of the sealing tube in a form-fitting fashion.

BRIEF DESCRIPTION OF SEVERAL VIEWS OF THE DRAWINGS

In the following aspects of the present invention are described in greater detail using a preferred embodiment, which is shown in the attached drawings.

DETAILED DESCRIPTION OF THE INVENTION

Figure 1:
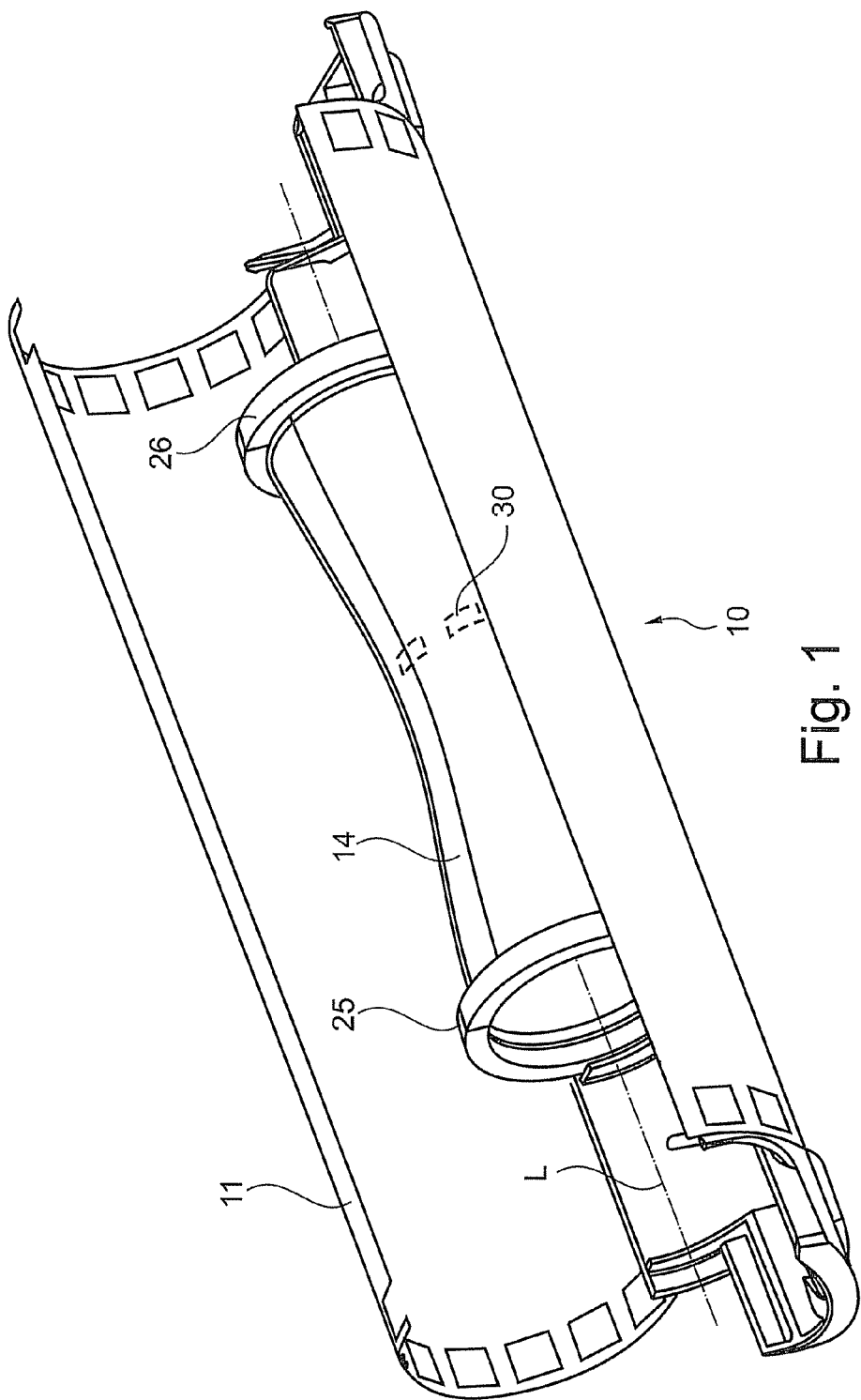
FIG. 1 illustrates schematically a line conduit with a sealing tube formed in accordance with an embodiment of the present invention.
Figure 2:
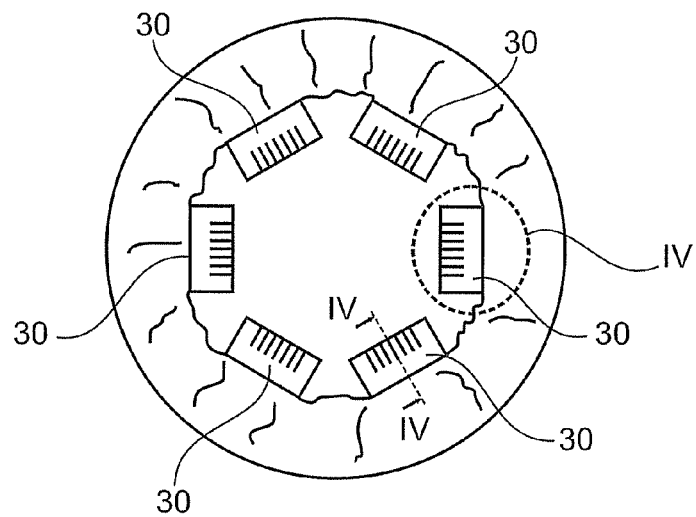
FIG. 2 provides an axial view of a sealing tube according to an embodiment of the present invention.

FIG. 1 shows a line conduit 10, as is known from DE 10 2006 035 475 A1 mentioned at the outset. It includes a jacket made from a covering tube 11, which is shown opened here. A sealing tube 14 is arranged inside the covering tube 11, comprising a flexible and/or elastic, thin-walled, and gas-tight rubber tissue or film material. Support rings 25, 26 are arranged at the axial ends of the sealing tube 14, by which the sealing tube is held inside the covering tube 11 such that in the initial position it is open and (except for a slight constriction) it is cylindrical. The two support rings 25, 26 can be relatively distorted in reference to each other about a longitudinal axis L of the line conduit, causing the wall of the sealing tube 14 to be spirally distorted and urged to contract towards the longitudinal axis L. This way, the sealing tube closely contacts a line or a package of lines guided through the conduit. This aspect is generally known from prior art.

Figure 3:
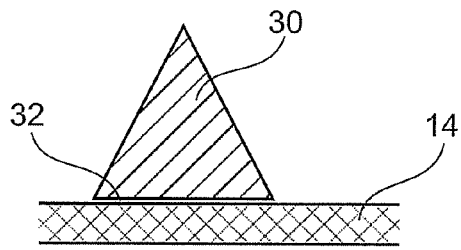
FIG. 3 illustrates schematically a cross section taken along the line III-III of FIG. 2.
Figure 4:
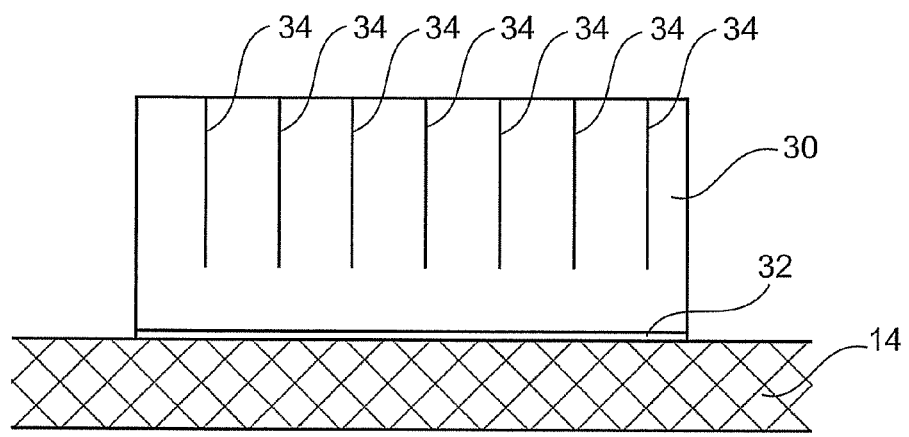
FIG. 4 illustrates in an enlarged scale detail IV of FIG. 2.

According to aspects of the present invention, it is provided that several sealing elements 30 are provided inside the sealing tube, which are embodied separated from each other and arranged in the circumferential direction at a distance from each other on the inside of the wall of the sealing tube. In the illustrated embodiment, six sealing elements are used, which show a triangular cross section and are adhered with their exterior sides to the wall of the sealing tube (see adhesive layer 32 in FIGS. 3 and 4). Alternatively the sealing elements 30 may also be sewn to the wall of the sealing tube 14.

The sealing elements 30 are arranged here such that they extend perpendicularly in reference to the longitudinal axis of the sealing tube. In other words: the sealing elements 30 extend as an (interrupted) narrow ring in the circumferential direction along the interior of the sealing tube (also see FIG. 1). EPDM is particularly advantageous as the material for the sealing elements 30. Each sealing element 30 is notched in a comb-like fashion (see slots 34 particularly in FIG. 4), so that several adjacent elastic sealing segments are formed at a sealing element, independent from each other. The sealing segments may have a width ranging from about 1 to 3 millimeters.

The length of the sealing elements 30 is sized in the circumferential direction such that, in the exemplary embodiment shown with six separate sealing elements an overall length of sealing elements develops, which is approximately equivalent to half the circumference of the sealing tube 14. For a tube with a diameter of approximately 105 millimeters and a length of approximately 220 millimeters, each of the sealing elements shows a length of about 25 millimeters, a width of about 12 millimeters (equivalent to approximately 5% of the length of the tube), and a height of about 11 millimeters.

The invention claimed is:

1. A sealing tube for a line conduit and a line passed through the sealing tube, the sealing tube being configured to be held at its ends with the ends distorted in reference to each other about a longitudinal axis to cause a wall of the sealing tube to be spirally distorted and urged to contract towards the longitudinal axis, the sealing tube comprising several distinct sealing elements distanced from each other in a circumferential direction of the sealing tube to form an interrupted ring inside the sealing tube, the sealing elements extending perpendicularly in reference to the longitudinal axis of the sealing tube, the sealing elements being fully separated from each other at an inner surface of the sealing tube,
wherein the sealing elements are arranged approximately at the longitudinal center of the sealing tube, and
wherein the wall presses the sealing elements against the line and contracts the sealing elements together to close the interrupted ring and form an annular barrier that seals against penetration of gaseous media as the wall contracts towards the longitudinal axis in response to the ends being spirally distorted in reference to each other.

2. A sealing tube according to claim 1, wherein the sealing elements are distanced from each other in the circumferential direction of the sealing tube.

3. A sealing tube according to claim 1, wherein the overall length of the sealing elements is smaller than the circumference of the sealing tube, wherein the overall length is calculated from the sums of the lengths of the elements located in a cross-sectional level, the cross-sectional level defined by a cross section through the tube perpendicularly in reference to its longitudinal axis.

4. A sealing tube according to claim 3, wherein the overall length of the sealing elements is approximately equivalent to 50% of the circumference of the sealing tube.

5. A sealing tube according to claim 1, wherein the total number of sealing elements is six, the six sealing elements arranged equally over the circumference of the sealing tube, wherein the length of the individual sealing elements is approximately equivalent to 8% of the circumference of the sealing tube.

6. A sealing tube according to claim 1, wherein the sealing elements have a triangular cross-section.

7. A sealing tube according to claim 1, wherein the sealing elements are slotted perpendicularly in reference to their longitudinal direction.

8. A sealing tube according to claim 1, wherein the sealing elements have a height between about 5 millimeters to about 20 millimeters.

9. A sealing tube according to claim 1, wherein the sealing elements comprise a material selected from elastomer, natural and synthetic rubbers, or silicones.

10. A sealing tube according to claim 9, wherein the sealing elements comprise closed-celled ethylene propylene diene rubber.

11. A sealing tube according to claim 1, wherein the sealing elements are adhered or sewn to the sealing tube.

12. A sealing tube for a line conduit and a line passed through the sealing tube, the sealing tube having a first end and a second end, the sealing tube comprising several separate sealing elements distanced from each other to form an interrupted ring inside the sealing tube at the approximate longitudinal center of the sealing tube, the sealing elements extending perpendicularly in reference to the longitudinal axis of the sealing tube, the sealing elements each have a respective length extending in a circumferential direction of the sealing tube and a respective width extending in the longitudinal direction of the sealing tube, wherein the length of each sealing element is greater than its respective width, the sealing tube being configured to be held at its ends with the ends rotated relative to each other about a longitudinal axis to cause a wall of the sealing tube to be spirally distorted to contract the sealing elements together to close the interrupted ring and form an annular barrier that seals against penetration of gaseous media and to contract towards the longitudinal axis and press the sealing elements against the line.

13. A sealing tube according to claim 1, wherein the sealing elements each have a respective length extending in a circumferential direction of the sealing tube and a respective width extending in the longitudinal direction of the sealing tube, and wherein the length of each sealing element is greater than its respective width.

14. A sealing tube according to claim 13, wherein the sealing elements are all of equal lengths and equal widths to one another.

15. A sealing tube according to claim 12, wherein the sealing elements are fully separated from each other at an inner surface of the sealing tube.

16. A sealing tube for a line conduit, the sealing tube being configured to be held at its ends with the ends distorted in reference to each other about a longitudinal axis to cause a wall of the sealing tube to be spirally distorted and urged to contract towards the longitudinal axis, the sealing tube comprising several distinct sealing elements distanced from each other to form an interrupted ring inside the sealing tube, the sealing elements extending perpendicularly in reference to the longitudinal axis of the sealing tube, the sealing elements being fully separated from each other at an inner surface of the sealing tube, wherein:
   the sealing elements are arranged approximately at the longitudinal center of the sealing tube; and
   in response to the wall being spirally distorted, a portion of the wall of the sealing tube that is approximately at the longitudinal center of the sealing tube contracts towards the longitudinal axis, radially presses the sealing elements against one or more lines passing through the sealing tube, and closes gaps between the sealing elements of the interrupted ring to form an annular barrier that seals against penetration of gaseous media.

* * * * *